United States Patent
Nie et al.

(10) Patent No.: US 12,117,955 B2
(45) Date of Patent: Oct. 15, 2024

(54) SPREAD SPECTRUM CLOCK NEGOTIATION METHOD, AND PERIPHERAL COMPONENT INTERCONNECT EXPRESS DEVICE AND SYSTEM

(71) Applicant: Huawei Technologies Co., Ltd., Guangdong (CN)

(72) Inventors: Er Nie, Shenzhen (CN); Kun Wang, Shenzhen (CN); Pan Li, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/951,473

(22) Filed: Sep. 23, 2022

(65) Prior Publication Data

US 2024/0104046 A1    Mar. 28, 2024

Related U.S. Application Data

(63) Continuation of application No. PCT/CN2020/080976, filed on Mar. 24, 2020.

(51) Int. Cl.
G06F 13/14    (2006.01)
G06F 13/40    (2006.01)
G06F 13/42    (2006.01)

(52) U.S. Cl.
CPC .......... *G06F 13/423* (2013.01); *G06F 13/405* (2013.01)

(58) Field of Classification Search
CPC ............................ G06F 13/423; G06F 13/405
See application file for complete search history.

(56) References Cited

U.S. PATENT DOCUMENTS

2014/0126612 A1*  5/2014  Tresidder ............ G06F 13/4273
                                                                  375/259
2016/0188524 A1*  6/2016  Froelich .............. G06F 13/4059
                                                                  710/106

(Continued)

FOREIGN PATENT DOCUMENTS

CN    102708086 A    10/2012
CN    107341124 A    11/2017

(Continued)

OTHER PUBLICATIONS

Anon: "Separate Refclk Independent SSC Architecture (SKIS)",PCI Express Base Spec. Rev. 3.0, Jan. 10, 2013 (Jan. 10, 2013)pp. 1-14, XP093028899,[retrieved on Mar. 3, 2023].

*Primary Examiner* — Henry Tsai
*Assistant Examiner* — Kim T Huynh
(74) *Attorney, Agent, or Firm* — WOMBLE BOND DICKINSON (US) LLP

(57) ABSTRACT

This application provides a spread spectrum clock negotiation method, and a peripheral component interconnect express device and system, to implement dynamic negotiation between a transmit end and a receive end on an SSC capability in the peripheral component interconnect express system. The method includes: A second PCIe device generates first indication information, where the first indication information is used to indicate whether the second PCIe device has a spread spectrum clock capability. The second PCIe device sends the first indication information to a first PCIe device. The first PCIe device determines, based on the first indication information, whether to perform spread spectrum clock on a reference clock of the first PCIe device.

17 Claims, 6 Drawing Sheets

(56) References Cited

U.S. PATENT DOCUMENTS

2017/0315956 A1\* 11/2017 Choi ..................... G06F 1/266
2018/0157286 A1\* 6/2018 Quiet ....................... G06F 1/10
2018/0285227 A1\* 10/2018 Sharma ............... H04L 43/0823
2019/0041898 A1 2/2019 Harriman et al.
2020/0409885 A1\* 12/2020 Denworth ........... G06F 13/4022

FOREIGN PATENT DOCUMENTS

| CN | 109634899 A | 4/2019 |
| JP | 2012003639 A | 1/2012 |

\* cited by examiner

SPREAD SPECTRUM CLOCK NEGOTIATION METHOD, AND PERIPHERAL COMPONENT INTERCONNECT EXPRESS DEVICE AND SYSTEM

CROSS-REFERENCE TO RELATED APPLICATIONS

This application is a continuation of International Application No. PCT/CN2020/080976, filed on Mar. 24, 2020, which is hereby incorporated by reference in their entirety.

TECHNICAL FIELD

This application relates to the field of communications technologies, and in particular, to a spread spectrum clock negotiation method, and a peripheral component interconnect express device and system.

BACKGROUND

A peripheral component interconnect express (peripheral component interconnect express, PCIe) standard is a high-speed serial computer expansion bus standard. The standard is widely applied in devices such as a personal computer and a server. A device performing communication according to the PCIe standard may be referred to as a PCIe device.

When the PCIe device performs communication according to the PCIe standard, a high-speed serial link causes electromagnetic interference to another device due to features such as a high frequency and a centralized spectrum. To reduce the electromagnetic interference to the another device, the PCIe device may enable a spread spectrum clock (SSC) function. In other words, the PCIe device modulates a reference clock by using a low frequency. In this case, a noise spectrum is dispersed, to reduce the electromagnetic interference to the another device.

A typical communication system by using the PCIe standard may be shown in FIG. 1. In FIG. 1, a PCIe root complex (RC) may be considered as a host, and a PCIe endpoint (EP) may be considered as an external device connected to the host. A retimer is separately connected to the PCIe RC and the PCIe EP and is configured to extend a communication distance between the PCIe RC and the PCIe EP. In the system shown in FIG. 1, two-way data exchange may be performed between any two directly connected components. For example, the PCIe RC may serve as a transmit end, and the retimer may serve as a receive end; or the retimer may serve as a transmit end, and the PCIe RC may serve as a receive end; or the PCIe EP may serve as a transmit end, and the retimer may serve as a receive end; or the retimer may serve as a transmit end, and the PCIe EP may serve as a receive end.

In the system shown in FIG. 1, the PCIe RC, the PCIe EP, and the retimer use different reference clocks. This scenario may be referred to as an independent clock scenario. In the independent clock scenario, when the transmit end in the system enables the SSC function, the receive end needs to support SSC clock data recovery (CDR). In other words, the receive end may perform clock data recovery (which may indicate that the receive end has an SSC capability) on spread spectrum data sent by the transmit end. In the existing PCIe protocol, a hardware and software procedure in which the transmit end and the receive end negotiate the SSC capability is not defined. Generally, the transmit end determines based on a parameter value predefined in software whether the receive end has the SSC capability, and the transmit end replaces firmware based on related information to adapt to a capability of the receive end.

Therefore, a negotiation mechanism between the transmit end and the receive end is urgently needed, so that the transmit end and the receive end can dynamically negotiate the SSC capability.

SUMMARY

Embodiments of this application provide a spread spectrum clock negotiation method, and a peripheral component interconnect express device and system, to implement dynamic negotiation between a transmit end and a receive end on an SSC capability in the peripheral component interconnect express system.

According to a first aspect, an embodiment of this application provides a spread spectrum clock negotiation method. The method includes the following operations: A first peripheral component interconnect express PCIe device receives first indication information sent by a second PCIe device. The first indication information is used to indicate whether the second PCIe device has a spread spectrum clock capability. The first PCIe device determines, based on the first indication information, whether to perform spread spectrum clock on a reference clock of the first PCIe device.

In the spread spectrum clock negotiation method provided in the first aspect, because the second PCIe device sends, to the first PCIe device, the first indication information used to indicate whether the second PCIe device has the spread spectrum clock capability, the first PCIe device may determine, based on the first indication information, whether to perform spread spectrum clock on the reference clock of the first PCIe device. If the first indication information indicates that the second PCIe device has the spread spectrum clock capability, the first PCIe device may enable an SSC function to complete dynamic negotiation between the first PCIe device and the second PCIe device on the SSC capability.

In one embodiment, that the first PCIe device determines, based on the first indication information, whether to perform spread spectrum clock on the reference clock of the first PCIe device may be implemented in the following manner: The first PCIe device performs spread spectrum clock on the reference clock when the first indication information indicates that the second PCIe device has the spread spectrum clock capability.

In addition, after the first PCIe device performs spread spectrum clock on the reference clock, the first PCIe device may send data to the second PCIe device based on the reference clock obtained after the spread spectrum clock.

In the foregoing solution, after the first PCIe device enables the SSC function, the first PCIe device may send the data to the second PCIe device based on the reference clock obtained after the spread spectrum clock, to reduce electromagnetic interference to another device in a data transmission process. After receiving the data, the second PCIe device can trace and recover data with a large frequency offset, to complete data parsing.

Specifically, that the first PCIe device receives the first indication information sent by the second PCIe device includes: The first PCIe device receives a first SKP ordered set sent by the second PCIe device. The first SKP ordered set carries the first indication information. The first PCIe device parses the first SKP ordered set to obtain the first indication information.

In the foregoing solution, the first SKP ordered set may be used to carry the first indication information, to reduce signaling exchange between the first PCIe device and the second PCIe device. Specifically, the first indication information may be carried by using a Vender defined field in the first SKP ordered set.

In one embodiment, the method further includes: The first PCIe device receives second indication information sent by the second PCIe device. The second indication information is used to indicate whether the second PCIe device supports transmission/reception of an SKP ordered set at a specified rate less than a preset rate.

In a PCIe system, an SKP ordered set is sent between two PCIe devices at a high rate, to eliminate a frequency offset between the two PCIe devices. The high rate may be considered as the preset rate. After the first PCIe device and the second PCIe both enable the SSC function, a system bandwidth may be reduced if the first PCIe device and the second PCIe device still send an SKP ordered set at the preset rate. Therefore, in this embodiment of this application, if the second indication information received by the first PCIe device indicates that the second PCIe device supports transmission/reception of the SKP ordered set at the specified rate less than the preset rate, the first PCIe device may periodically send a second SKP ordered set to the second PCIe device at the specified rate, thereby reducing reduction probability of the system bandwidth.

Further, after the first PCIe device receives the second indication information sent by the second PCIe device, the first PCIe device may periodically send the second SKP ordered set to the second PCIe device at the specified rate when the second indication information indicates that the second PCIe device supports transmission/reception of the SKP ordered set at the specified rate.

In one embodiment, that the first PCIe device receives the second indication information sent by the second PCIe device includes: The first PCIe device receives the first SKP ordered set sent by the second PCIe device. The first SKP ordered set carries the second indication information. The first PCIe device parses the first SKP ordered set to obtain the second indication information.

In the foregoing solution, the first SKP ordered set may be used to carry the second indication information, to reduce signaling exchange between the first PCIe device and the second PCIe device. Specifically, the second indication information may be carried by using a Vender defined field in the first SKP ordered set.

According to a second aspect, an embodiment of this application provides a spread spectrum clock negotiation method. The method includes the following operations: A second peripheral component interconnect express PCIe device generates first indication information. The first indication information is used to indicate whether the second PCIe device has a spread spectrum clock capability. The second PCIe device sends the first indication information to a first PCIe device.

In the spread spectrum clock negotiation method provided in the second aspect, because the second PCIe device sends, to the first PCIe device, the first indication information used to indicate whether the second PCIe device has the spread spectrum clock capability, the first PCIe device may determine, based on the first indication information, whether to perform spread spectrum clock on a reference clock of the first PCIe device. If the first indication information indicates that the second PCIe device has the spread spectrum clock capability, the first PCIe device may enable an SSC function to complete dynamic negotiation between the first PCIe device and the second PCIe device on the SSC capability.

Specifically, that the second PCIe device sends the first indication information to the first PCIe device includes: The second PCIe device sends a first SKP ordered set to the first PCIe device. The first SKP ordered set carries the first indication information.

In the foregoing solution, the first SKP ordered set may be used to carry the first indication information, to reduce signaling exchange between the first PCIe device and the second PCIe device.

In addition, after the second PCIe device sends the first indication information to the first PCIe device, the second PCIe device may receive data sent by the first PCIe device based on the reference clock obtained after the spread spectrum clock.

In one embodiment, the method further includes: The second PCIe device generates second indication information. The second indication information is used to indicate whether the second PCIe device supports transmission/reception of an SKP ordered set at a specified rate less than a preset rate. The second PCIe device sends the second indication information to the first PCIe device.

In the foregoing solution, if the second indication information received by the first PCIe device indicates that the second PCIe device supports transmission/reception of the SKP ordered set at the specified rate less than the preset rate, the first PCIe device may periodically send a second SKP ordered set to the second PCIe device at the specified rate, thereby reducing reduction probability of a system bandwidth.

Further, that the second PCIe device sends the second indication information to the first PCIe device includes: The second PCIe device sends the first SKP ordered set to the first PCIe device. The first SKP ordered set carries the second indication information.

In the foregoing solution, the first SKP ordered set may be used to carry the second indication information, to reduce signaling exchange between the first PCIe device and the second PCIe device.

In addition, before the second PCIe device sends the first indication information to the first PCIe device, the method further includes: The second PCIe device performs spread spectrum clock on a reference clock of the second PCIe device.

In the foregoing solution, if the second PCIe device has the SSC capability, before the second PCIe device sends the first indication information to the first PCIe device, the second PCIe device may first perform spread spectrum clock on the reference clock of the second PCIe device (that is, enable the SSC function). In this way, after the first PCIe device receives the first indication information and enables the SSC function based on the first indication information, the first PCIe device and the second PCIe device both enable the SSC function. Therefore, the first PCIe device and the second PCIe device may perform two-way data exchange based on the reference clock obtained after the spread spectrum clock.

According to a third aspect, an embodiment of this application further provides a PCIe device. For beneficial effects, refer to descriptions in the first aspect. Details are not described herein again. A structure of the PCIe device includes a processor, and may further include a transmitter and a receiver. The processor is configured to support the PCIe device in executing a corresponding function in the method in the foregoing first aspect. The transceiver is configured to communicate with another PCIe device.

According to a fourth aspect, an embodiment of this application further provides a PCIe device. For beneficial effects, refer to descriptions in the second aspect. Details are not described herein again. A structure of the PCIe device includes a processor, and may further include a transmitter and a receiver. The processor is configured to support the PCIe device in executing a corresponding function in the method in the foregoing second aspect. The transceiver is configured to communicate with another PCIe device.

According to a fifth aspect, an embodiment of this application further provides a PCIe system. The PCIe system includes the PCIe device provided in the third aspect and the PCIe device provided in the fourth aspect.

According to a sixth aspect, this application further provides a computer readable storage medium. The computer readable storage medium stores instructions. When the instructions are run on a computer, the computer is enabled to perform the method according to the foregoing aspects.

According to a seventh aspect, this application further provides a computer program product including instructions. When the instructions are run on a computer, the computer is enabled to perform the method according to the foregoing aspects.

According to an eighth aspect, this application further provides a computer chip. The chip is connected to a memory. The chip is configured to read and execute a software program stored in the memory, to perform the method according to the foregoing aspects.

DESCRIPTION OF EMBODIMENTS

The following first describes an application scenario of embodiments of this application.

Figure 1:
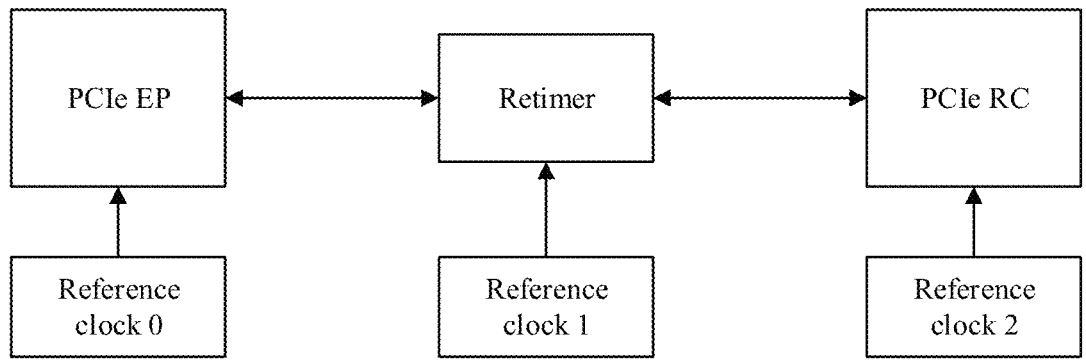
FIG. 1 is a schematic diagram of a structure of a PCIe system according to the conventional technologies.

Embodiments of this application may be applied to a PCIe system shown in FIG. 1. A PCIe RC is a host, and a PCIe EP is an external device. A retimer is separately connected to the PCIe RC and the PCIe EP and is configured to extend a communication distance between the PCIe RC and the PCIe EP. In the PCIe system, communication is performed between the EP and the retimer and between the RC and the retimer both according to the PCIe standard.

In the PCIe system shown in FIG. 1, two-way data exchange may be performed between any two directly connected components. For example, the PCIe RC may serve as a transmit end, and the retimer may serve as a receive end; or the retimer may serve as a transmit end, and the PCIe RC may serve as a receive end; or the PCIe EP may serve as a transmit end, and the retimer may serve as a receive end; or the retimer may serve as a transmit end, and the PCIe EP may serve as a receive end. Any component shown in FIG. 1 includes a transmitter (transmitter) and a receiver (receiver) to send and receive data. The PCIe protocol specifies that exchanged data is differential data when the components in the PCIe system exchange data.

It should be noted that, in actual application, the PCIe system may not include a retimer, that is, the PCIe RC is directly connected to the PCIe EP; or the PCIe system may include a plurality of (for example, two) retimers, and the plurality of retimers are cascaded to extend the communication distance between the PCIe RC and the PCIe EP to a greater extent.

As described above, in the PCIe system, two-way data exchange may be performed between any two directly connected components. In an independent clock scenario, if the transmit end enables an SSC function, a reference clock of the transmit end is modulated based on a low-frequency clock. A frequency offset range is large. A frequency jitter of the clock is directly reflected in data sent by the transmit end. Therefore, the receive end needs to be capable of tracing and recovering the differential data with the large frequency offset. In other words, the receive end supports SSC CDR. For example, before the PCIe RC sends data to the retimer, the PCIe RC needs to learn whether the retimer supports SSC CDR, to determine whether to enable the SSC function. For another example, before the retimer sends data to the PCIe EP, the retimer needs to learn whether the PCIe EP supports SSC CDR, to determine whether to enable the SSC function.

Specifically, for the components in the PCIe system, enabling the SSC function may be implemented through enabling an SSC generator (SSC Generation) circuit module in the component.

In addition, in the PCIe system, when the SSC function is not enabled, a skip (SKP) ordered set is sent between any two directly connected components at a high rate. The SKP ordered set is used to eliminate a frequency offset between the two components. The SKP ordered set may also be referred to as a control SKP bitstream (that is, control SKP bitstream) or an SKP packet. Generally, the SKP ordered set is periodically sent. For example, the PCIe EP periodically sends the SKP ordered set to the retimer, and the retimer also periodically sends the SKP ordered set to the PCIe EP, to eliminate a frequency offset between the PCIe EP and the retimer.

After the two components performing data exchange both enable the SSC function, a system bandwidth may be reduced if the two components still send an SKP ordered set at a high rate. Therefore, in this embodiment of this application, the two components performing data exchange may negotiate the SSC function, and may further negotiate whether to support transmission/reception of an SKP ordered set at a low rate. For example, before the PCIe RC sends data to the retimer, the PCIe RC needs to learn whether the retimer supports transmission/reception of the SKP ordered set at the low rate. If the retimer supports transmission/reception of the SKP ordered set at the low rate, the PCIe RC may send the SKP ordered set to the retimer at a low rate, thereby reducing reduction probability of a bandwidth.

Specifically, for the components in the PCIe system, sending the SKP ordered set may be implemented through enabling an SKP generator (SKP Generation) circuit module in the component.

The following further describes in detail embodiments of this application with reference to accompanying drawings.

It should be noted that in embodiments of this application, "a plurality of" means two or more. In addition, in description of this application, terms such as "first" and "second" are merely used for distinguishing and description, but should not be understood as indicating or implying relative importance, or should not be understood as indicating or implying a sequence.

Embodiments of this application provide a spread spectrum clock negotiation method, and a peripheral component interconnect express device and system, to implement dynamic negotiation between a transmit end and a receive end on an SSC capability in a peripheral component interconnect express system.

Figure 2:
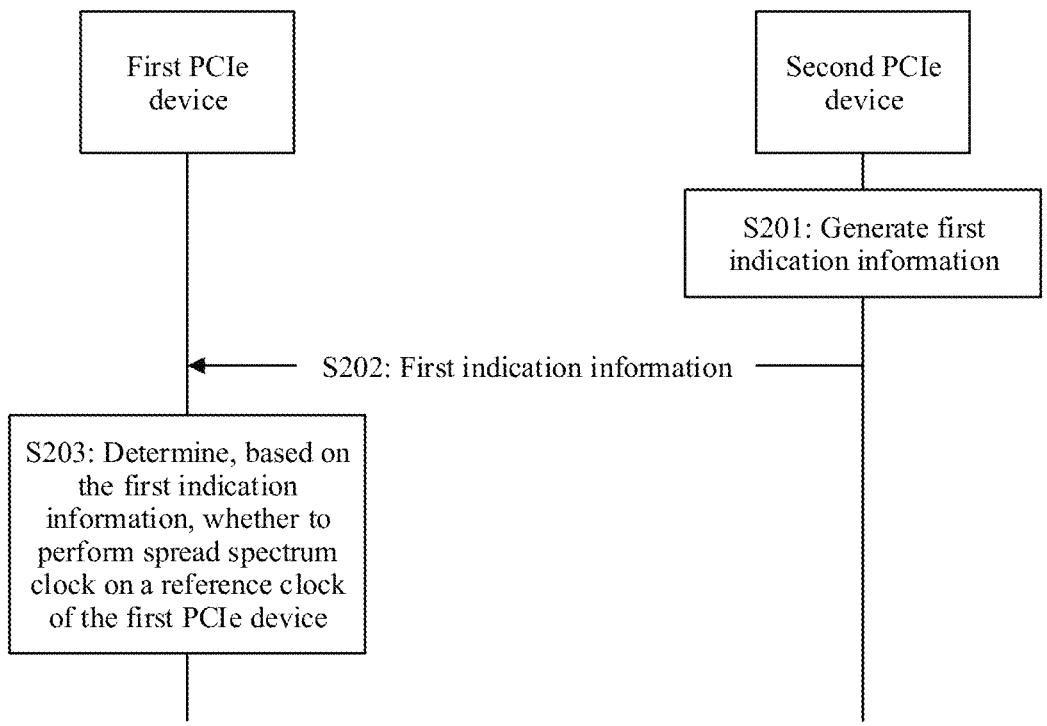
FIG. 2 is a schematic flowchart of a spread spectrum clock negotiation method according to an embodiment of this application.

FIG. 2 is a schematic flowchart of a spread spectrum clock negotiation method according to an embodiment of this application. The method includes the following operations.

S201: A second PCIe device generates first indication information.

The first indication information is used to indicate whether the second PCIe device has a spread spectrum clock capability, that is, whether the second PCIe device supports SSC CDR (that is, whether the second PCIe device can perform clock data recovery on spread spectrum data sent by the first PCIe device).

S202: The second PCIe device sends the first indication information to the first PCIe device.

In this embodiment of this application, the first PCIe device and the second PCIe device may be any two different components in the PCIe system shown in FIG. 1. For example, the first PCIe device is a PCIe EP, and the second PCIe device is a retimer; the first PCIe device is a PCIe RC, and the second PCIe device is a retimer; or the first PCIe device is a PCIe EP, and the second PCIe device is a PCIe RC. In other words, in the method shown in FIG. 2, dynamic negotiation on the SSC capability can be implemented between any two components in the PCIe system.

S203: The first PCIe device determines, based on the first indication information, whether to perform spread spectrum clock on a reference clock of the first PCIe device.

Specifically, in operation S203, the first PCIe device may perform spread spectrum clock on the reference clock of the first PCIe device when the first indication information indicates that the second PCIe device has the spread spectrum clock capability. In other words, the first PCIe device may modulate the reference clock by using a low frequency.

After the first PCIe device performs spread spectrum clock on the reference clock, the first PCIe device may send data to the second PCIe device based on the reference clock obtained after the spread spectrum clock. In this case, a noise spectrum is dispersed, to reduce electromagnetic interference to another device. Because the second PCIe device has the spread spectrum clock capability, after receiving the spread spectrum data sent by the first PCIe device, the second PCIe device may perform clock data recovery on the received data, to complete data exchange between the first PCIe device and the second PCIe device.

In actual application, the first indication information may be carried in the first SKP ordered set sent by the second PCIe device to the first PCIe device. The first SKP ordered set may be periodically sent. In other words, that the first PCIe device receives the first indication information sent by the second PCIe device may use the following implementation: The first PCIe device receives the first SKP ordered set sent by the second PCIe device. The first SKP ordered set carries the first indication information. The first PCIe device parses the first SKP ordered set to obtain the first indication information.

In the PCIe protocol, a vender defined (Vender defined) field is defined in an SKP ordered set. The field may be used to carry private link control information. Specifically, the field includes eight bits, that is, payload [7:0]. In this embodiment of this application, the first indication information may be carried by using payload [0]. For example, when payload [0] is 1, it indicates that the second PCIe device has the spread spectrum clock capability; or when payload [0] is 0, it indicates that the second PCIe device does not have the spread spectrum clock capability. In addition, payload [7:4] is 0×1 to indicate that the Vender defined field carries SSC capability information of the second PCIe device. After receiving the first SKP ordered set, the first PCIe device may obtain the Vender defined field through parsing. When payload [7:4] is 0×1, the first PCIe device may learn that the Vender defined field carries the SSC capability information of the second PCIe device. Then, the first PCIe device may determine through parsing payload [0] whether the second PCIe device has the SSC capability.

In actual application, when parsing the first SKP ordered set, the first PCIe device may first perform cyclic redundancy check (cyclic redundancy check, CRC) on the first SKP ordered set. A specific manner of the CRC check is a conventional technology. Details are not described herein.

Certainly, in this embodiment of this application, the first indication information may also be carried in another message sent by the second PCIe device to the first PCIe device. Alternatively, the second PCIe device may directly send the first indication information to the first PCIe device. Bits occupied by the first indication information are not limited to the examples in the foregoing embodiment. A carrying manner and a specific format of the first indication information are not limited in this embodiment of this application.

It should be noted that, in actual application, if the second PCIe device has the SSC capability, before the second PCIe device sends the first indication information to the first PCIe device, the second PCIe device may first perform spread spectrum clock on the reference clock of the second PCIe device (that is, enable the SSC function). In this way, after the first PCIe device receives the first indication information and enables the SSC function based on the first indication information, the first PCIe device and the second PCIe device both enable the SSC function. Therefore, the first PCIe device and the second PCIe device may perform two-way data exchange based on the reference clock obtained after the spread spectrum clock.

In addition, in this embodiment of this application, the first PCIe device may further receive second indication information sent by the second PCIe device. The second indication information is used to indicate whether the second PCIe device supports transmission/reception of an SKP ordered set at a specified rate less than a preset rate (also may be referred to as whether the second PCIe device has a low-rate SKP capability).

As described above, in the PCIe system, an SKP ordered set is sent between two PCIe devices at a high rate, to eliminate a frequency offset between the two PCIe devices.

The high rate may be considered as the preset rate. After the first PCIe device and the second PCIe both enable the SSC function, a system bandwidth may be reduced if the first PCIe device and the second PCIe device still send an SKP ordered set at the preset rate. Therefore, in this embodiment of this application, if the second indication information received by the first PCIe device indicates that the second PCIe device supports transmission/reception of the SKP ordered set at the specified rate less than the preset rate, the first PCIe device may periodically send a second SKP ordered set to the second PCIe device at the specified rate, thereby reducing reduction probability of the system bandwidth.

It is not difficult to understand that a second SKP ordered set sent by the first PCIe device to the second PCIe device may also carry indication information indicating whether the first PCIe device supports transmission/reception of an SKP ordered set at a specified rate. After receiving the indication information, the second PCIe device may also send the first SKP ordered set to the first PCIe device at the specified rate. In this case, the first PCIe device and the second PCIe device both send the SKP ordered set at the specified rate lower than the preset rate, to reduce the system bandwidth.

Specifically, similar to the first indication information, the second indication information may also be carried in the first SKP ordered set sent by the second PCIe device to the first PCIe device. After receiving the first SKP ordered set, the first PCIe device may parse the first SKP ordered set to obtain the second indication information.

The second indication information may be carried by using a Vender defined field in the first SKP ordered set. For example, in the Vender defined field, when payload [0] is 1, it indicates that the second PCIe device has the spread spectrum clock capability; or when payload [0] is 0, it indicates that the second PCIe device does not have the spread spectrum clock capability. In addition, when payload [1] is 1, it indicates that the second PCIe device supports transmission/reception of the SKP ordered set at the specified rate; or when payload [1] is 0, it indicates that the second PCIe device does not support transmission/reception of the SKP ordered set at the specified rate. In addition, payload [7:4] is 0x1 to indicate that the Vender defined field carries the SSC capability information and the low-rate SKP capability information of the second PCIe device.

Figure 3:
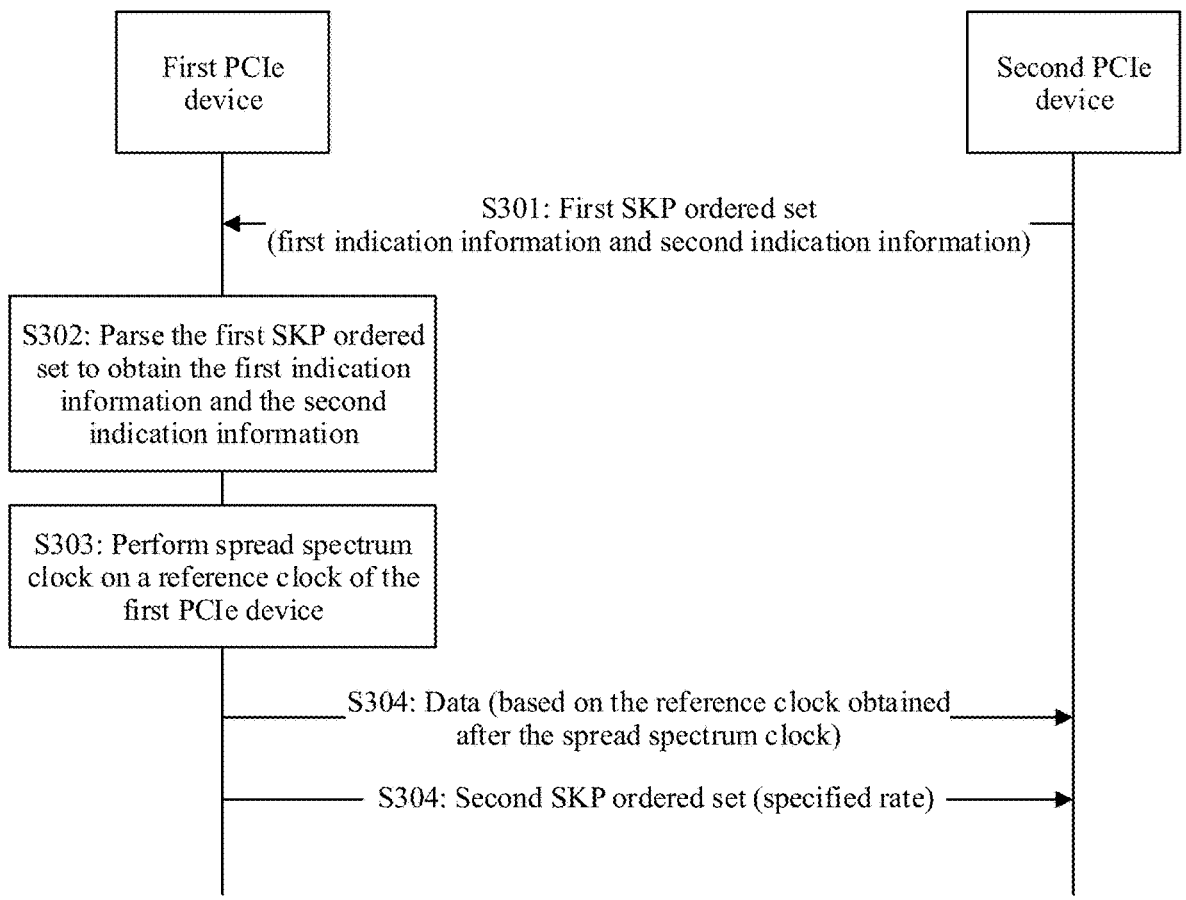
FIG. 3 is a schematic flowchart of another spread spectrum clock negotiation method according to an embodiment of this application.

FIG. 3 may show a specific procedure of a spread spectrum clock negotiation method according to an embodiment of this application.

S301: A second PCIe device sends a first SKP ordered set to a first PCIe device.

The first SKP ordered set carries first indication information and second indication information. The first indication information is used to indicate whether the second PCIe device has the spread spectrum clock capability. The second indication information is used to indicate whether the second PCIe device supports transmission/reception of an SKP ordered set at a specified rate less than a preset rate.

S302: The first PCIe device parses the first SKP ordered set to obtain the first indication information and the second indication information.

S303: The first PCIe device performs spread spectrum clock on a reference clock of the first PCIe device when the first indication information indicates that the second PCIe device has the spread spectrum clock capability and the second indication information supports transmission/reception of the SKP ordered set at the specified rate.

S304: The first PCIe device sends data to the second PCIe device based on the reference clock obtained after the spread spectrum clock, and sends a second SKP ordered set to the second PCIe device at a specified rate.

The second SKP ordered set may be periodically sent.

It should be noted that the spread spectrum clock negotiation method shown in FIG. 3 may be considered as a specific example of the method shown in FIG. 2. For implementations not described in detail on the spread spectrum clock negotiation method shown in FIG. 3, refer to related descriptions in FIG. 2. Details are not described herein again.

For example, it is assumed that the first PCIe device is a PCIe RC, and the second PCIe device is a PCIe EP. An interaction procedure between the PCIe RC and the PCIe EP may be shown in FIG. 4.

Figure 4:
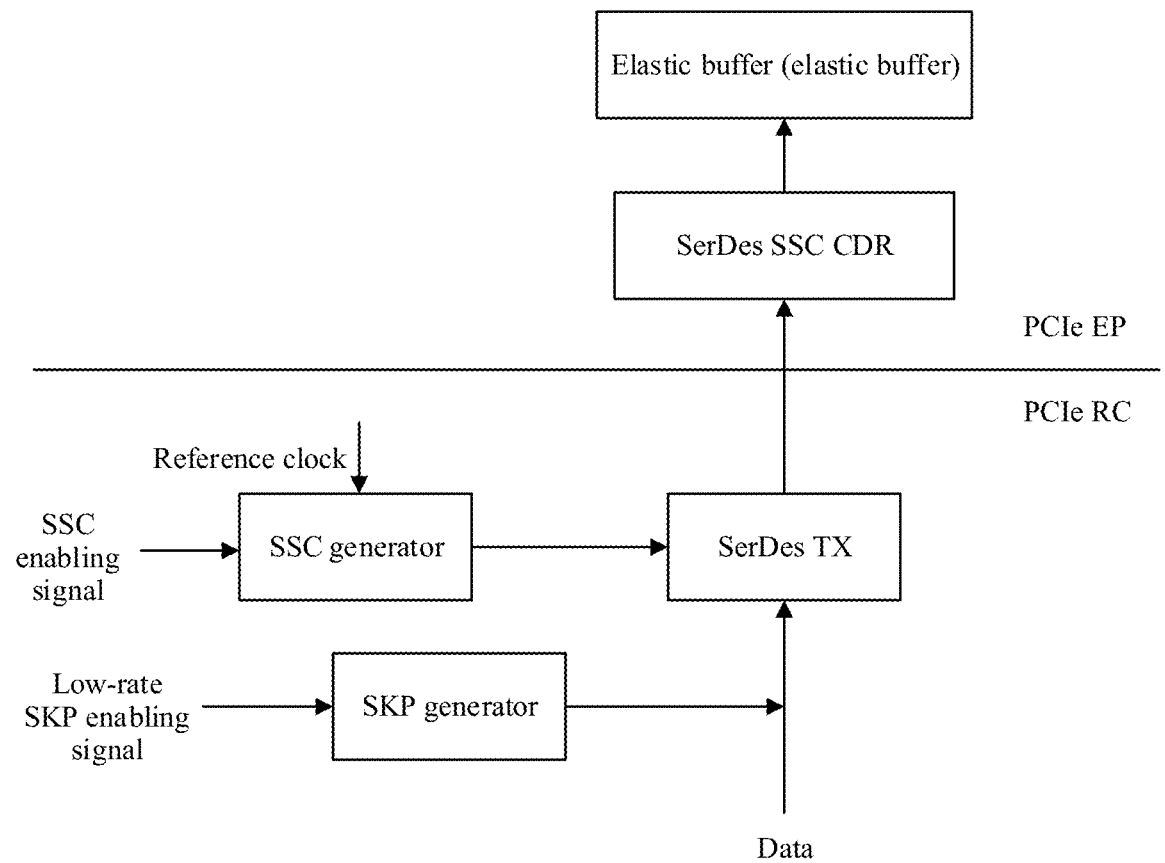
FIG. 4 is a schematic diagram of an interaction procedure between two PCIe devices according to an embodiment of this application.

In FIG. 4, a serializer/deserializer (SerDes) TX in the PCIe RC may be considered as a transmitter, and SerDes SSC CDR in the PCIe EP may be considered as a receiver supporting SSC CDR.

After the PCIe EP adds the SSC capability information and the low-rate SKP capability information of the PCIe EP into an SKP ordered set and sends the SKP ordered set to the PCIe RC, the PCIe RC parses the SKP ordered set, and learns that the PCIe EP has the SSC capability and the low-rate SKP capability. Then, the PCIe RC generates an SSC enabling signal and a low-rate SKP enabling signal. After receiving the SSC enabling signal, an SSC generator performs spread spectrum clock on a reference clock. The SerDes TX sends data based on the reference clock obtained after the spread spectrum clock. After receiving the low-rate SKP enabling signal, the SKP generator indicates the SerDes TX to send the SKP ordered set at the low rate. Data received by the SerDes SSC CDR in the PCIe EP is stored in an elastic buffer.

In conclusion, in the spread spectrum clock negotiation method provided in this embodiment of this application, because the second PCIe device sends, to the first PCIe device, the first indication information used to indicate whether the second PCIe device has the spread spectrum clock capability, the first PCIe device may determine, based on the first indication information, whether to perform spread spectrum clock on the reference clock of the first PCIe device. If the first indication information indicates that the second PCIe device has the spread spectrum clock capability, the first PCIe device may enable the SSC function to complete dynamic negotiation between the first PCIe device and the second PCIe device on the SSC capability.

Further, after the first PCIe device enables the SSC function, the first PCIe device may send data to the second PCIe device based on the reference clock obtained after the spread spectrum clock, to reduce electromagnetic interference to another device in a data transmission process. After receiving the data, the second PCIe device can trace and recover data with a large frequency offset, to complete data parsing.

In actual application, the foregoing spread spectrum clock negotiation method may be implemented by using different circuit modules in the first PCIe device and the second PCIe device in a cooperative manner. As described above, each PCIe device includes a transmitter and a receiver. Specifically, each PCIe device may include the following several circuit modules:

1. SKP generator (SKP Generation): Generate a corresponding SKP packet based on the capability information indicating whether the PCIe device supports the SSC.

2. SSC generator (SSC Generation): Perform spread spectrum clock at the transmit end based on an external SSC enabling signal.
3. Transmitter: A transmitter at a physical layer (PHY) is configured to send data generated by the physical layer.
4. Receiver: A receiver at a physical layer is configured to recover a clock and data based on a received differential signal.
5. CRC check: Check whether a CRC field segment of a received SKP packet is correct.
6. SKP parsing (SKP Extract): Parse content of the received SKP packet to obtain SSC capability information of a peer PCIe device.

Figure 5:
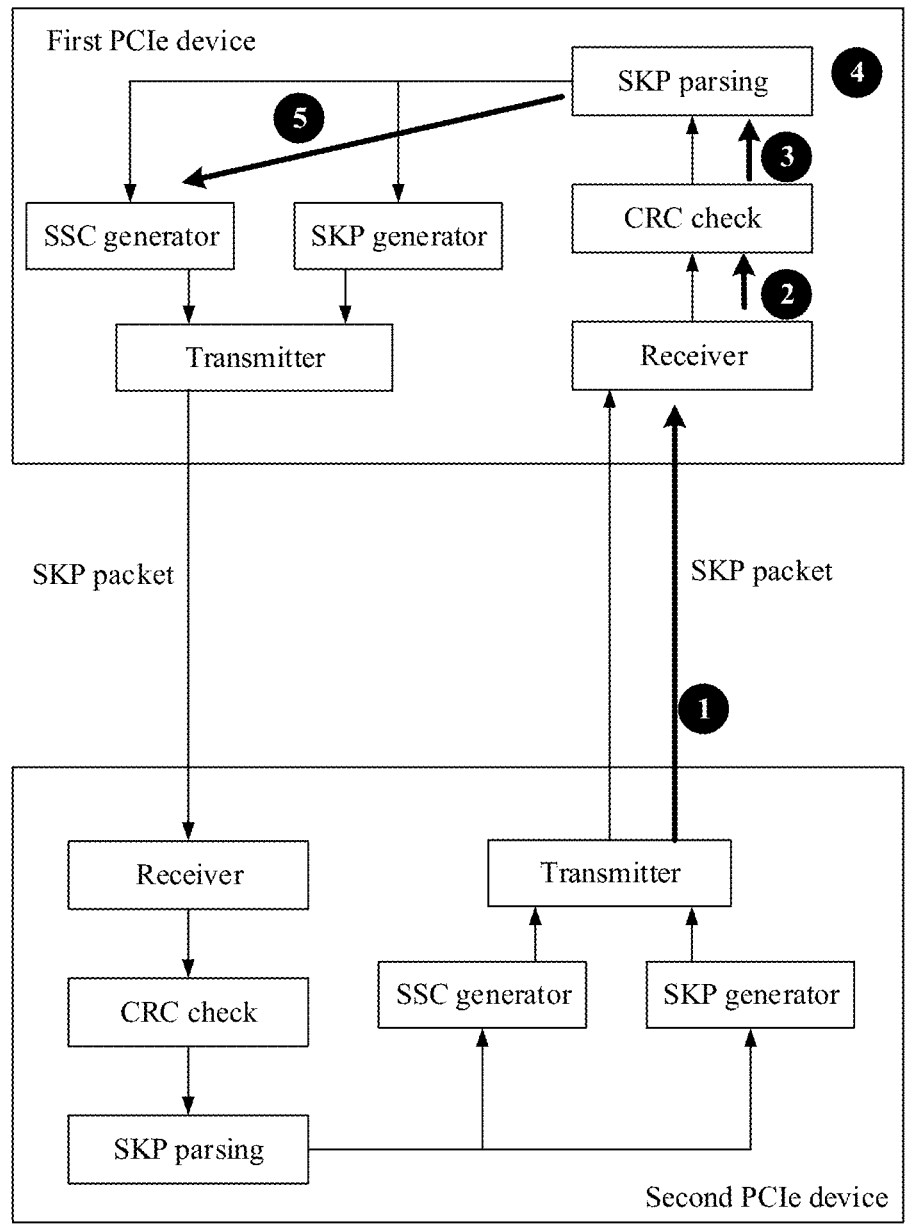
FIG. 5 is a schematic diagram of another interaction procedure between two PCIe devices according to an embodiment of this application.

FIG. 5 is a schematic diagram of an interaction procedure between two PCIe devices including the foregoing circuit modules.

1. The second PCIe device adds the SSC capability information into the SKP packet and sends the SKP packet to the first PCIe device by using the transmitter.
2. The receiver of the first PCIe device recovers a clock and data based on a received bitstream.
3. The CRC check module of the first PCIe device checks CRC of the received SKP packet. If the check succeeds, the SKP packet is sent to the SKP parsing module.
4. The SKP parsing module parses content of the received SKP packet to obtain the SSC capability information of the second PCIe device.
5. The first PCIe device enables the SSC generator.

In addition, the second PCIe device may further add, into the SKP packet, information indicating that the second PCIe device supports transmission of the SKP packet at the specified rate lower than the preset rate. After the SKP parsing module of the first PCIe device parses out the information, the SKP generator may be enabled.

It can be learned from the procedure in FIG. 5 that, in the solution provided in this embodiment of this application, an SSC auto-negotiation procedure may be implemented by using an original hardware module in a PCIe device. This solution does not depend on another interface on a board, to avoid obtaining an SSC capability of a peer end by using an external hardware interface and software in the conventional technologies, thereby implementing auto-negotiation of the SSC capability in a data exchange procedure between PCIe devices.

Figure 6:
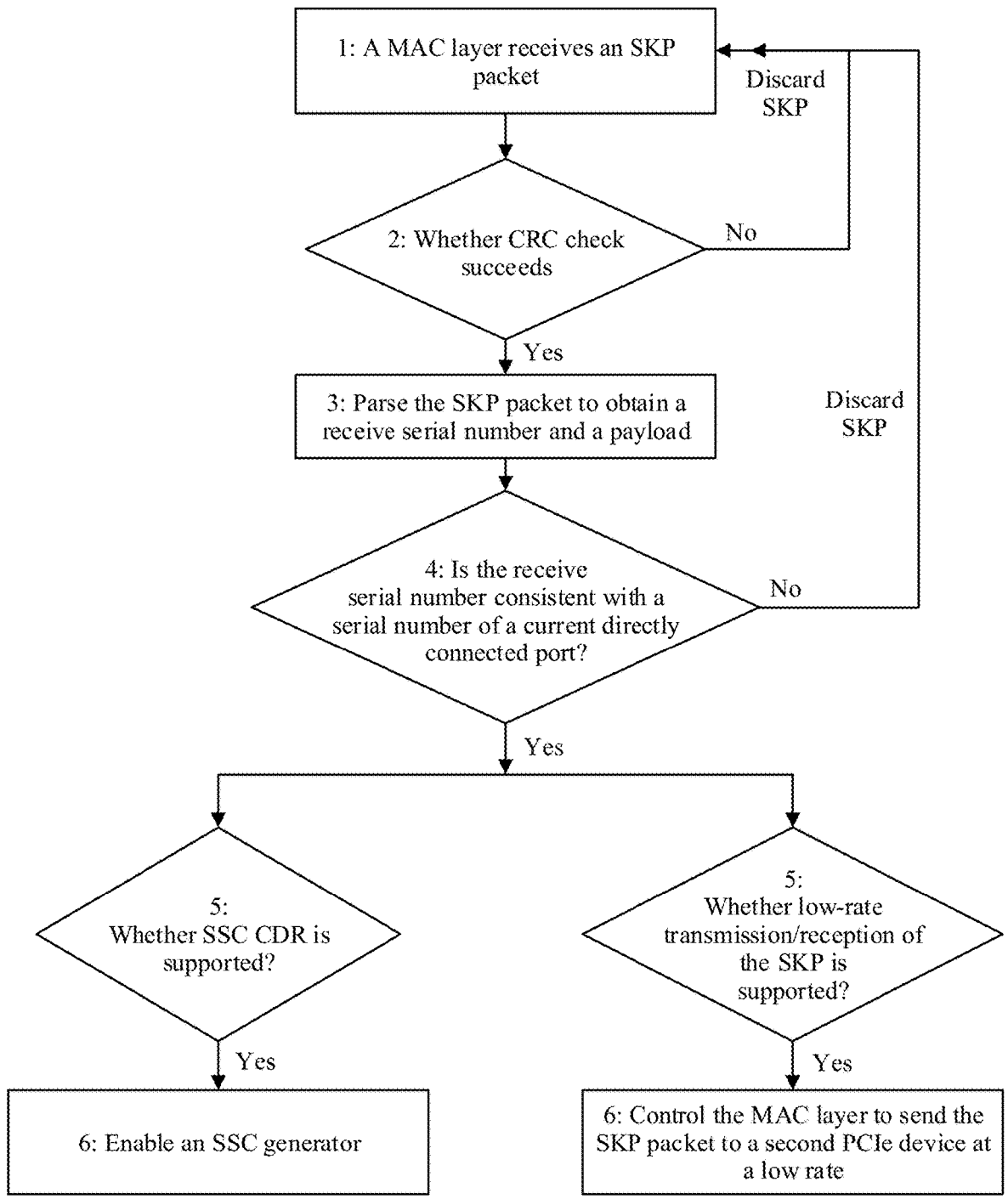
FIG. 6 is a schematic flowchart in which a PCIe device enables an SSC generator according to an embodiment of this application.

Specifically, a specific procedure in which the first PCIe device enables the SSC generator may be shown in FIG. 6.

1: A MAC layer receives an SKP packet.
2: Determine whether the CRC check on the SKP packet succeeds. If the CRC check fails, discard the SKP packet.
3: If the CRC check succeeds, parse the SKP packet to obtain a receive serial number and a payload (margin payload).
4: Determine whether the receive serial number is consistent with a serial number of a current directly connected port. If the receive serial number is consistent with the serial number, discard the SKP packet.

There may be a plurality of transmit ports and a plurality of receive ports in the PCIe device. If a receive serial number in an SKP packet received by a port is inconsistent with a serial number of a current directly connected port of the PCIe device, it indicates that a port for sending the SKP packet is not the current directly connected port of the PCIe device and the SKP packet may be discarded.

5: If the receive serial number is consistent with the serial number of the current directly connected port, further determine a corresponding field in the payload of the SKP packet, to determine whether the second PCIe device supports the SSC CDR and whether the second PCIe device supports low-rate transmission/reception of the SKP.
6: If the second PCIe device supports the SSC CDR, enable the SSC generator. If the second PCIe device supports the low-rate transmission/reception of the SKP, control a media access control (MAC) sublayer to send the SKP packet to the second PCIe device at a low rate.

Figure 7:
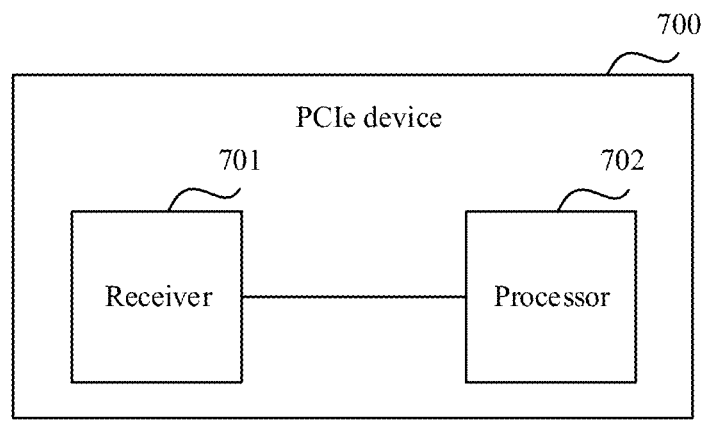
FIG. 7 is a schematic diagram of a structure of a PCIe device according to an embodiment of this application.

Based on the same application concept, an embodiment of this application further provides a peripheral component interconnect express device. As shown in FIG. 7, the PCIe device 700 includes a receiver 701 and a processor 702.

The receiver 701 is configured to receive first indication information sent by a second PCIe device. The first indication information is used to indicate whether the second PCIe device has a spread spectrum clock capability. The processor 702 is configured to determine, based on the first indication information, whether to perform spread spectrum clock on a reference clock of the PCIe device 700.

In one embodiment, when the processor 702 determines based on the first indication information whether to perform spread spectrum clock on the reference clock of the PCIe device 700, the processor 702 is specifically configured to: perform spread spectrum clock on the reference clock of the PCIe device 700 when the first indication information indicates that the second PCIe device has the spread spectrum clock capability.

In addition, the PCIe device 700 may further include a transmitter. After the processor 702 performs spread spectrum clock on the reference clock of the PCIe device 700, the transmitter is configured to send data to the second PCIe device based on the reference clock obtained after the spread spectrum clock.

In one embodiment, when receiving the first indication information sent by the second PCIe device, the receiver 701 is specifically configured to receive a first SKP ordered set sent by the second PCIe device. The first SKP ordered set carries the first indication information. The processor 702 is further configured to parse the first SKP ordered set to obtain the first indication information.

In addition, the receiver 701 is further configured to receive second indication information sent by the second PCIe device. The second indication information is used to indicate whether the second PCIe device supports transmission/reception of an SKP ordered set at a specified rate less than a preset rate.

In one embodiment, the PCIe device 700 may further include a transmitter. After the receiver 701 receives the second indication information, the transmitter is configured to periodically send a second SKP ordered set to the second PCIe device at the specified rate when the second indication information indicates that the second PCIe device supports transmission/reception of the SKP ordered set at the specified rate.

In one embodiment, when receiving the second indication information sent by the second PCIe device, the receiver 701 is specifically configured to receive a first SKP ordered set sent by the second PCIe device. The first SKP ordered set carries the second indication information. The processor 702 is further configured to parse the first SKP ordered set to obtain the second indication information.

It should be noted that the PCIe device 700 may be configured to perform the method performed by the first PCIe device in the spread spectrum clock negotiation method shown in FIG. 2. For implementations not described in detail about the PCIe device 700, refer to related descriptions of the spread spectrum clock negotiation method shown in FIG. 2. Details are not described herein again.

In addition, in the PCIe device 700, the receiver 701 may be considered as the receiver in the first PCIe device in FIG. 5, the transmitter may be considered as the transmitter in the first PCIe device in FIG. 5, and the processor 702 may be considered as a circuit module in the first PCIe device in FIG. 5 except the transmitter and the receiver.

Figure 8:
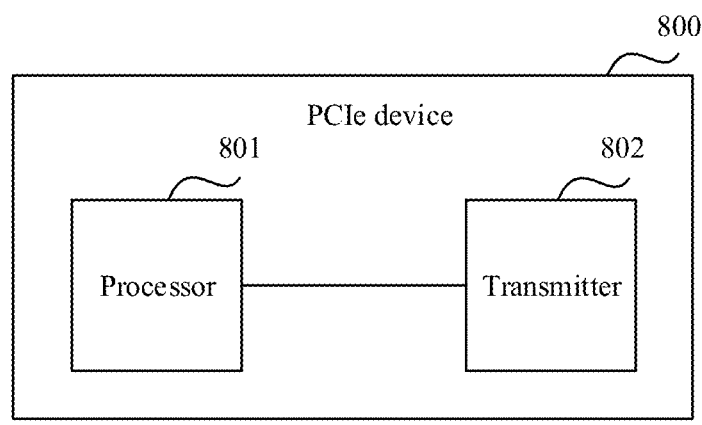
FIG. 8 is a schematic diagram of a structure of another PCIe device according to an embodiment of this application.

Based on the same application concept, an embodiment of this application further provides a peripheral component interconnect express device. As shown in FIG. 8, the PCIe device 800 includes a processor 801 and a transmitter 802.

The processor 801 is configured to generate first indication information. The first indication information is used to indicate whether the PCIe device 800 has a spread spectrum clock capability. The transmitter 802 is configured to send the first indication information to a first PCIe device.

Specifically, when sending the first indication information to the first PCIe device, the transmitter 802 is specifically configured to send a first SKP ordered set to the first PCIe device. The first SKP ordered set carries the first indication information.

In addition, the PCIe device 800 further includes a receiver. After the transmitter 802 sends the first indication information to the first PCIe device, the receiver is configured to receive data sent by the first PCIe device based on a reference clock obtained after the spread spectrum clock.

In one embodiment, the processor 801 is further configured to generate second indication information. The second indication information is used to indicate whether the PCIe device 800 supports transmission/reception of an SKP ordered set at a specified rate less than a preset rate. The transmitter 802 is further configured to send the second indication information to the first PCIe device.

In one embodiment, when sending the second indication information to the first PCIe device, the transmitter 802 is specifically configured to send the first SKP ordered set to the first PCIe device. The first SKP ordered set carries the second indication information.

In one embodiment, the processor 801 is further configured to: before the transmitter 802 sends the first indication information to the first PCIe device, perform spread spectrum clock on the reference clock of the PCIe device 800.

It should be noted that the PCIe device 800 may be configured to perform the method performed by the second PCIe device in the spread spectrum clock negotiation method shown in FIG. 2. For implementations not described in detail about the PCIe device 800, refer to related descriptions of the spread spectrum clock negotiation method shown in FIG. 2. Details are not described herein again.

In addition, in the PCIe device 800, the receiver may be considered as the receiver in the second PCIe device in FIG. 5, the transmitter 802 may be considered as the transmitter in the second PCIe device in FIG. 5, and the processor 801 may be considered as a circuit module in the second PCIe device in FIG. 5 except the transmitter and the receiver.

Figure 9:
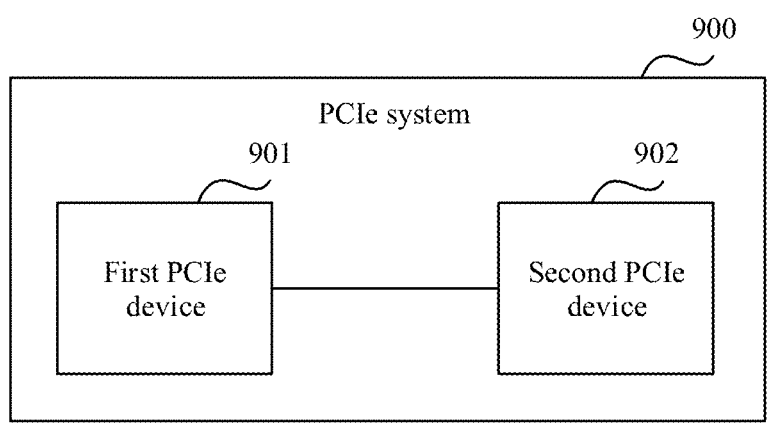
FIG. 9 is a schematic diagram of a structure of a PCIe system according to an embodiment of this application.

Based on the same application concept, an embodiment of this application further provides a peripheral component interconnect express system. As shown in FIG. 9, the PCIe system 900 includes a first PCIe device 901 and a second PCIe device 902. The second PCIe device 902 is configured to: generate first indication information, and send the first indication information to the first PCIe device 901. The first indication information is used to indicate whether the second PCIe device 902 has a spread spectrum clock capability. The first PCIe device 901 is configured to determine, based on the first indication information, whether to perform spread spectrum clock on a reference clock of the first PCIe device 901.

In other words, the first PCIe device 901 may be configured to perform the method performed by the first PCIe device in the spread spectrum clock negotiation method shown in FIG. 2, and the second PCIe device 902 may be configured to perform the method performed by the second PCIe device in the spread spectrum clock negotiation method shown in FIG. 2. For specific implementation details of the first PCIe device 901 and the second PCIe device 902, refer to related descriptions of the spread spectrum clock negotiation method shown in FIG. 2. Details are not described herein again.

Clearly, persons skilled in the art can make various modifications and variations to embodiments of this application without departing from the scope of embodiments of this application. Therefore, this application is intended to cover these modifications and variations provided that they fall within the scope of protection defined by the following claims and their equivalent technologies.

What is claimed is:

1. A spread spectrum clock negotiation method, comprising:
    receiving, by a first peripheral component interconnect express (PCIe) device from a second PCIe device, first indication information indicating whether the second PCIe device has a spread spectrum clock capability, wherein the receiving, by the first PCIe device from the second PCIe device, first indication information comprises:
        receiving, by the first PCIe device from the second PCIe device, a first skip (SKP) ordered set carrying the first indication information; and
        parsing, by the first PCIe device, the first SKP ordered set to obtain the first indication information; and
    determining, by the first PCIe device based on the first indication information, whether to perform spread spectrum clock on a reference clock of the first PCIe device.

2. The method according to claim 1, wherein the determining, by the first PCIe device based on the first indication information, whether to perform spread spectrum clock on a reference clock of the first PCIe device comprises:
    performing, by the first PCIe device, spread spectrum clock on the reference clock in response to that the first indication information indicates that the second PCIe device has the spread spectrum clock capability.

3. The method according to claim 2, wherein after the performing, by the first PCIe device, spread spectrum clock on the reference clock, the method further comprises:
    sending, by the first PCIe device to the second PCIe device, data based on the reference clock obtained after the spread spectrum clock.

4. The method according to claim 1, further comprising:
    receiving, by the first PCIe device from the second PCIe device, second indication information indicating whether the second PCIe device supports transmission/reception of an SKP ordered set at a specified rate less than a preset rate.

5. The method according to claim 4, wherein after the receiving, by the first PCIe device from the second PCIe device, second indication information, the method further comprises:
    periodically sending, by the first PCIe device to the second PCIe device, a second SKP ordered set at the specified rate in response to that the second indication information indicates that the second PCIe device supports transmission/reception of the SKP ordered set at the specified rate.

6. The method according to claim 4, wherein the receiving, by the first PCIe device from the second PCIe device, second indication information comprises:
receiving, by the first PCIe device from the second PCIe device, the first SKP ordered set sent carrying the second indication information; and
parsing, by the first PCIe device, the first SKP ordered set to obtain the second indication information.

7. A peripheral component interconnect express (PCIe) device, comprising:
a receiver, configured to receive, from a second PCIe device, first indication information indicating whether the second PCIe device has a spread spectrum clock capability; and
a processor, configured to determine, based on the first indication information, whether to perform spread spectrum clock on a reference clock of the PCIe device,
wherein when receiving, from the second PCIe device, the first indication information, the receiver is configured to:
receive, from the second PCIe device, a first skip (SKP) ordered set carrying the first indication information; and
the processor is further configured to:
parse the first SKP ordered set to obtain the first indication information.

8. The device according to claim 7, wherein when determining, based on the first indication information, whether to perform spread spectrum clock on the reference clock of the PCIe device, the processor is configured to:
perform spread spectrum clock on the reference clock in response to that the first indication information indicates that the second PCIe device has the spread spectrum clock capability.

9. The device according to claim 8, further comprising:
a transmitter, configured to: after the processor performs spread spectrum clock on the reference clock, send, to the second PCIe device, data based on the reference clock obtained after the spread spectrum clock.

10. The device according to claim 7, wherein the receiver is further configured to:
receive, from the second PCIe device, second indication information indicating whether the second PCIe device supports transmission/reception of an SKP ordered set at a specified rate less than a preset rate.

11. The device according to claim 10, further comprising:
a transmitter, configured to: after the receiver receives the second indication information, periodically send a second SKP ordered set to the second PCIe device at the specified rate in response to that the second indication information indicates that the second PCIe device supports transmission/reception of the SKP ordered set at the specified rate.

12. The device according to claim 10, wherein when receiving, from the second PCIe device, the second indication information, the receiver is configured to:
receive, from a second PCIe device, the first SKP ordered set carrying the second indication information; and
the processor is further configured to:
parse the first SKP ordered set to obtain the second indication information.

13. A non-transitory machine-readable medium having instructions stored therein, which when executed by a processor, cause the processor to:
receive, from a second peripheral component interconnect express (PCIe) device, first indication information indicating whether the second PCIe device has a spread spectrum clock capability, wherein when receiving, from the second PCIe device, the first indication information, the processor is caused to:
receive, from the second PCIe device, a first skip (SKP) ordered set carrying the first indication information; and
parse the first SKP ordered set to obtain the first indication information; and
determine, based on the first indication information, whether to perform spread spectrum clock on a reference clock of the first PCIe device.

14. The non-transitory machine-readable medium of claim 13, the processor is further to
perform spread spectrum clock on the reference clock in response to that the first indication information indicates that the second PCIe device has the spread spectrum clock capability.

15. The non-transitory machine-readable medium of claim 13, the processor is further to:
sending, to the second PCIe device, data based on the reference clock obtained after the spread spectrum clock.

16. The non-transitory machine-readable medium of claim 13, the processor is further to:
receive, from the second PCIe device, second indication information indicating whether the second PCIe device supports transmission/reception of an SKP ordered set at a specified rate less than a preset rate.

17. The non-transitory machine-readable medium of claim 16, the processor is further to:
periodically send, to the second PCIe device, a second SKP ordered set at the specified rate in response to that the second indication information indicates that the second PCIe device supports transmission/reception of the SKP ordered set at the specified rate.

* * * * *